May 20, 1924.                    1,494,599
J. C. GELHAYE ET AL
AUTOMOBILE SIGNAL
Filed Aug. 11, 1922        2 Sheets-Sheet 1
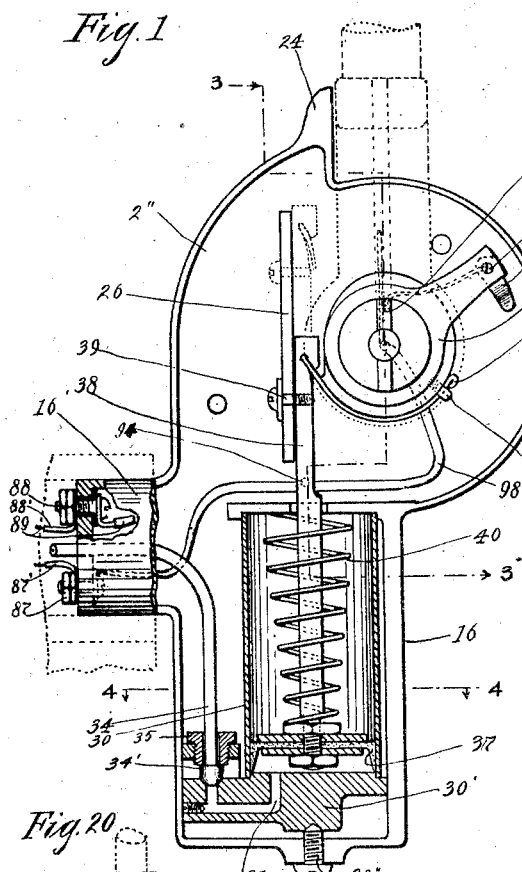
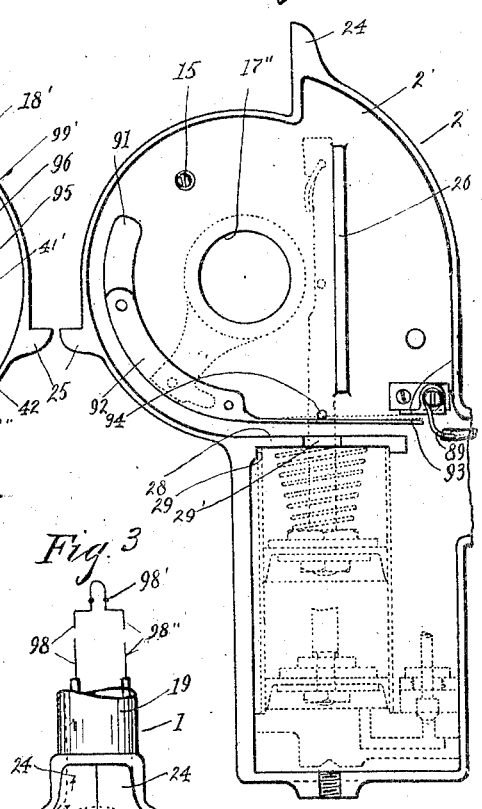
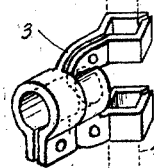
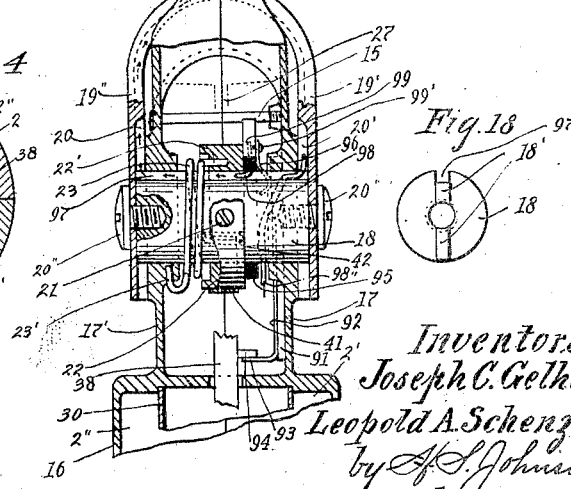
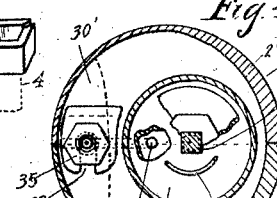
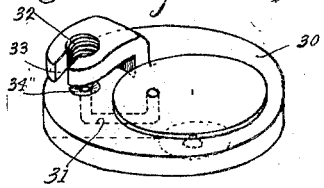
Inventors,
Joseph C. Gelhaye
Leopold A. Schenz
by J. S. Johnson
their Attorney.

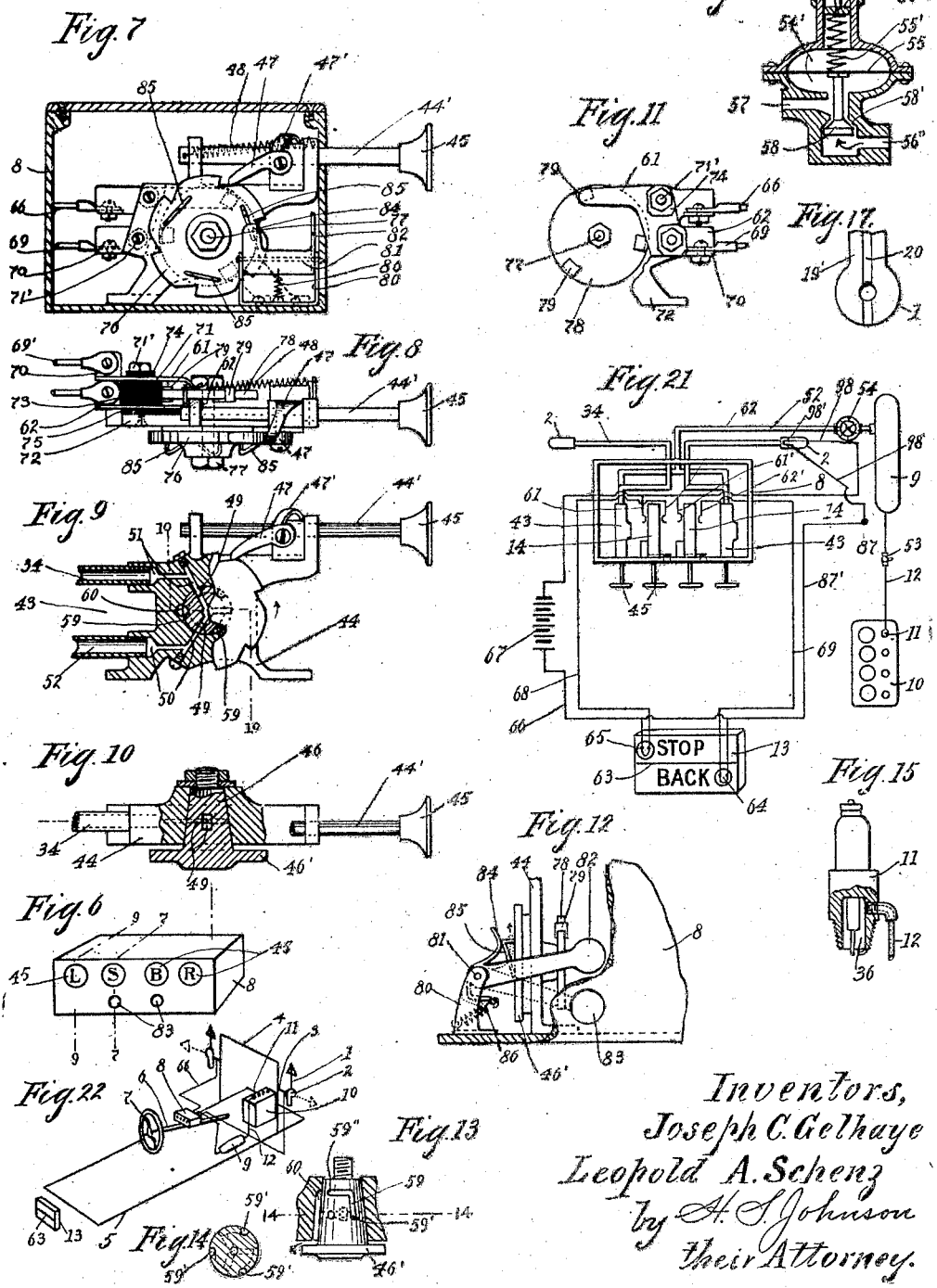

Patented May 20, 1924.

1,494,599

UNITED STATES PATENT OFFICE.

JOSEPH C. GELHAYE AND LEOPOLD A. SCHENZ, OF ST. PAUL, MINNESOTA.

AUTOMOBILE SIGNAL.

Application filed August 11, 1922. Serial No. 581,147.

*To all whom it may concern:*

Be it known that we, JOSEPH C. GELHAYE and LEOPOLD A. SCHENZ, citizens of the United States, residing at St. Paul, in the county of Ramsey and State of Minnesota, have invented certain new and useful Improvements in Automobile Signals, of which the following is a specification.

This invention relates to pneumatically actuated direction indicating signal devices for automobiles, and more particularly to the semaphore type of indicators, one of the objects of the invention being, to provide signaling means of the class described which will be efficient, easily applied, conveniently operated and compact in form.

A further object of the invention is the provision of semaphore signal means, which is actuated by the pressure in the combustion chamber of one or more of the cylinders of the motor, for the purpose of securing a high working pressure, to be thereby enabled to greatly reduce the proportions of the pneumatically operated mechanism for manipulating the semaphore arms.

Our invention also resides in certain novel features of construction, whereby the assembling of the device is greatly facilitated and the parts rendered simple, thereby reducing the cost of manufacture to a minimum.

A further object of the invention is the provision of signal means which may be operated from the driver's position, and whereby the driver of a following car may be warned by tail signals that the car is about to stop or back up, and by semaphore signals that the car is about to turn either to the right or left, all of said signals being operatively connected with a central power controlling source under the control of the operator. Other objects and advantages of the invention, including certain novel details of construction, will be pointed out as this specification progresses, the invention consisting in the construction, combination and arrangement of parts hereinafter described and claimed.

In the drawings forming a part of this specification:

Figures 1 and 2, are elevational views of the component parts of the composite housing for the semaphore arm actuating mechanism.

Figure 3, is a sectional view on line 3—3 of Figure 1.

Figure 4, is a sectional view on line 4—4 of Figure 1.

Figure 5, is a perspective view of the detachable cylinder head, forming part of the arm actuating mechanism.

Figure 6, is a perspective view of the switch box.

Figure 7, is a sectional view on line 7—7 of Figure 6, showing a side view of one of the switch units mounted in the switch box.

Figure 8, is a plan view of said switch unit, the box not being shown.

Figure 9, is a sectional view on line 9—9 of Figure 6, showing one of the air or gas controlling units mounted in the switch box, the box being partly broken away.

Figure 10, is a top view of Figure 9, a part thereof being shown in section on line 10—10 of Figure 9.

Figure 11, is a fragmentary view of the rear side of the switch unit shown in Figure 7.

Figure 12, is a front view of the switch unit, shown in Figure 7, the unit and the box being partly broken away.

Figure 13, is a view of a part of one of the air or gas controlling units, showing one of the parts in the side of the valve plug.

Figure 14, is a sectional view on line 14—14 of Figure 13.

Figure 15, is a side view of a spark plug shown partly in section, showing the manner of communicating with the combustion chamber thereof.

Figure 16, is a vertical sectional view of one form of automatic air pressure controlling valve used in connection with our invention.

Figure 17, is a view of the inside of one of the fork members of the semaphore arms.

Figure 18, is an end view of the fork of the shaft supporting the semaphore arms.

Figure 19, is a perspective view of the terminals of the gas supply pipes for the semaphore arms actuating mechanism.

Figure 20, is a perspective view of one of the supporting brackets for the semaphore housing on the automobile.

Figure 21, is a diagrammatic view showing the invention complete, including its connection to the spark plug; and Figure 22, is a diagrammatic perspective view, showing in a general way, the relative location of the parts with respect to the car body and wind shield.

In the drawings (Fig. 22) 1 designates the semaphore arms, which latter are swingably mounted respectively upon the semaphore housings, 2, which in turn are adjustably mounted on the automobile by means of the brackets 3 (Fig. 20).

In the drawings, the arms are shown mounted on the wind shield 4, which latter is here diagrammatically shown for convenience, as being supported on the chassis frame 5, carrying the steering column 6, which in turn carries the steering wheel 7.

The invention further comprises a switch box 8, preferably mounted in a suitable manner on the steering column and which contains air and electric current controlling devices for the signals and constitutes a central distributing source, a reserve air tank 9, located between the motor 10 and the switch box, is connected by means of the air conduit 12, with the spark plug 11, of the motor, and the air controlling mechanism within the switch box.

The invention further comprises a rear signal element 13, having electric connection with the switch units 14 in the switch box. The housing 2 is split vertically to form the halves 2' and 2", which are adapted to be bolted together as by the bolts 15, to form a composite casing, having a vertically disposed cylindrical lower shell portion 16, from which extends laterally, preferably at the top thereof and at right angles thereto, the cylindrical hollow branch 16'. The upper portion of the casing extends outwardly at a point opposite the branch 16' beyond the cylindrical housing portion, said extension being formed with spaced side walls 17 and 17' respectively, which walls are parallel with the central joint formed by the two halves of the housing, and are formed with aligned bores 17", which bores extend at right angles to said walls and rotatably support the shaft 18. The ends of said shaft are flush respectively with the outer sides of said walls, each end having radially disposed aligned lugs 18', extending outwardly therefrom.

Supported by said shaft is the semaphore arm 1, formed with a hollow shank 19 having a forked lower end, which end is composed of flat parallel side members 19' and 19", adapted to loosely embrace the upper casing portion between them, and fit slidably respectively over the ends of the shaft. The side members are formed upon their inner sides with longitudinal grooves 20 and 20' respectively (Fig. 17), said grooves being adapted to slidably receive the lugs 18', whereby the semaphore arm is nonrotatably attached to the shaft. To hold the arm removably positioned on the shaft, the screws 20" are employed, which latter extend, respectively, through said side members and are threaded in the ends of the shaft. Removably secured to the shaft as by means of the set screw 21, is the drum 22, to which is anchored at 22' the coil spring 23, the other end of said spring being anchored at 23' in the wall 17' of the casing. Under stress of this spring, the semaphore arm is yieldingly held in vertical position, the casing 2 being formed with an upstanding lug 24 to function as a stop therefor, and the outwardly extending lug 25 to function as a stop for said arm when the latter is in outswung position.

Interiorly, each of the component members of the casing is formed with a vertically disposed rib 26, extending inwardly from the wall 17 and at right angles thereto, and vertically at right angles to the shaft 18, and in parallelism with the axis of the cylindrical casing portion 16. These ribs are disposed approximately central of said cylindrical casing portion, and are located between the shaft 18 and the branch 16', and extend short of the full depth of the component casing portions, to thereby form a slideway 27, as indicated by dotted lines in Figure 3, when the housings are in assembled position.

The casing members are further formed with a transverse wall 28, extending at right angles to the axis of the assembled cylindrical casing portion, to form, when the casing members are assembled, an abutment having a circular recess 29 in its under side, and a circular aperture 29' concentric with said recess, said aperture being offset toward the shaft 18 relative to the axis of the cylindrical casing portion. Fitting removably at its top into said recess, is the cylinder shell 30, the lower end thereof being closed by the removable cylinder head 30'. This cylinder head is slidable in the cylindrical portion of the casing, and is engaged by the set screw 30" threaded in the bottom of the casing, whereby the cylinder shell 30 may be firmly held in position within the casing.

The cylinder head is formed with a port 31 communicating with the interior of the cylinder and opening into the cylindrical casing portion. On its upper surface, adjacent to the cylinder, the cylinder head is formed with an undercut lug having a vertically disposed threaded opening 32, which opening is in vertical alinement with the port 31. The lug is cut away as at 33, to permit the supply conduit or pipe 34 to be entered sidewise into the opening thus formed, said pipe being formed with a head 34' adapted to be slipped into the undercut of said lug and rest upon the seat 34" surrounding the opening of said port to form an airtight connection therewith. The pipe is surrounded by the gland nut 35, threaded into the opening 32 and engaging with the head 34', whereby the latter may be firmly forced against the seat 34''. Thus we secure a readily removable connection whereby air may be conducted into the cylinder at the lower end thereof, the pipe extending laterally through the branch 16' and to the spark plug 11 (Fig. 15). The connection at the spark plug as here shown, comprises a threaded L, threaded into the side of the spark plug in a manner to communicate with the combustion chamber 36 thereof, which in turn communicates with the combustion chamber of the cylinder, not shown. Thus the pressure ordinarily generated in the combustion chamber, both during the compression stroke of the piston and at the moment of ignition, is communicated to the interior of the cylinder, which pressure ordinarily varies from two to four hundred pounds per square inch.

Slidable in the cylinder is the piston 37 suitably secured to the piston rod 38, which latter extends through the opening 29' to a point approximately on a level with the axis of the shaft 18 and immediately adjacent to the periphery of the drum 22. The upper portion of the piston rod is preferably of squared cross-section and is adapted to slide with one of its flat sides against the ribs 26, and carries the guide pin 39, which latter traverses the guideway 27 between said ribs 26.

Extending from the abutment formed by the walls 28 (or what may be termed the upper cylinder head) to the top of the piston is the extensile coil spring 40, whereby the piston is constantly urged downward. Attached at one end to the top of the piston rod, is the pull member or strap 41, which strap winds partially around the periphery of the drum and is formed at its free end with a head 41'. The pull member extends slidably through an eye 42 (Fig. 3), which extends from the periphery of the drum and engages with said head. Obviously, responsive to the actuation of the piston, the drum will be revolved through the medium of the pull strap until the semaphore arm engages with the lug 25, whereby the upward movement of the piston is restricted.

It is to be noted that, by the use of the high pressure generated in the motor cylinder, we are enabled to successfully oppose the spring 23, which latter is sufficiently strong to return the semaphore arm to normal position. Further, owing to the sliding movement of the pull member in the eye 42, the semaphore arm may be promiscuously manipulated, as by meddling children, without a corresponding movement of the piston. This affords an important advantage over a structure wherein the piston is connected to move with every movement of the semaphore arm, it having been found that promiscuous handling of the device places undue strain upon the piston parts, frequently rendering them inoperative.

For the purpose of controlling actuation of the piston from the driver's position, the hand operable gas or air controlling unit 43 is provided, there being one unit for each semaphore arm. These units are mounted in the switch box 8, which latter may be mounted on the steering column or the instrument box, as desired. As indicated in Figure 9 of the drawings, each unit comprises a flat vertical plate or frame 44, extending interiorly transversely of the elongated switch box, and having slidably mounted thereon, the push rod 44'. This push rod slides parallel with and longitudinally of the frame and extends through the front wall of the switch box, and is provided at its forward extremity with a push button 45, said button being adapted to carry an identification mark to identify it with the specific semaphore arm with which it is operatively connected. Between the push rod and the base of the frame and rotatable in a plane parallel axially with said push rod, is the valve plug 46, said plug being preferably integral with the ratchet wheel 46', the teeth of said wheel being engageable by the pawl 47 carried by the push rod.

A spring arm 47', secured to the push rod and resting under stress at its free end on the pawl, urges the latter downward against the ratchet wheel, so that when the push rod is actuated, the ratchet wheel may be moved through a partial revolution, the push rod being returned to normal position by the contractile spring 48. Thus, the ratchet wheel may be moved through a step by step movement by a depression of the button 45. The valve plug is formed centrally with three radial symmetrically disposed ports 49, which ports are in open communication with one another centrally of the valve.

The frame 44 is formed with an inlet port 50 and a discharge port 51, said ports being disposed in a manner to register respectively with any two of the three radial ports 49, responsive to the movement of said ratchet wheel to any one of three positions to which it is movable by the depression of said push button.

Obviously, gas or air under pressure entering the inlet port 50, will pass through the ports in the plug and escape through the discharge port 51. As here shown, the ratchet wheel is formed with six teeth, so that each alternate stroke of the push rod will bring a pair of ports 49 into register respectively with the inlet and discharge ports. The discharge port 51 is connected by means of the supply conduit 34 to the semaphore actuating mechanism in the casing, as hereinbefore described. The inlet port 50 has connection by means of the inlet conduit 52 with the pressure tank 9, which tank is provided to function as a reserve pressure supply, to permit the signal device to be operated a reasonable period of time when the motor is inactive. This reserve pressure is accumulated by means of the check valve 53 (conventionally shown) connected into the line of pipe 12. It will be noted, that the pipe 52 (Fig. 21) supplies both air controlling units. We have found that the more or less extensive variation of pressure in the cylinder, causes a corresponding variation in the actuation of the semaphore arm, which is undesirable and more or less destructive of the parts.

To secure a uniform movement of both signal arms, we provide the automatic pressure regulator 54, which is connected into the conduit line 52 so that the air or gas must pass therethrough. It is to be understood, that any conventional form of pressure regulator may be used, the form here shown consisting of a valve body having an elliptical chamber 54', which chamber is divided by a diaphragm 55, against which a variable pressure is applied by means of the spring 55' extending between said diaphragm and the piston 56, said piston being screw fed by means of the threaded stem 56' threaded in the top of the valve body, said stem having a suitable hand wheel to be actuated thereby. Below the diaphragm, the valve body is formed with an inlet port 56" and an outlet port 57, said outlet port being in open communication with that part of the chamber 54' located beneath the diaphragm and with the inlet port 56".

Located between the inlet port and the discharge port 57 and firmly supported on the diaphragm, is the valve 58, adapted to seat on the seat 58' between the inlet and outlet ports. The valve may be described to operate as follows: As the pressure enters the port 56", the pressure will pass the valve and will enter the lower half of the chamber to fill same and discharge through the outlet port 57. Obviously, the pressure on the upper side of the diaphragm may be regulated by changing the tension in the spring 55. Should the gas or air pressure be undesirably high, the diaphragm will be flexed upwardly in opposition to the spring 55', thereby reducing the area of the passage-way around the valve 58, and thus automatically throttling the air or gas pressure supply. Should the pressure be undesirably low, the diaphragm will be flexed downwardly by the spring 55' and thereby open the port around the valve 58. Thus, the pressure is automatically regulated, so that both air controlling units will be constantly operating under a uniform pressure, the best working pressure being found by trial.

For the purpose of permitting the semaphore arm to be promptly returned to normal position, we provide the ports 59, sunk in the surface of the valve plug 46, and the port 60, sunk in the wall of the bore wherein the valve plug rotates. As is best shown in Figures 13 and 14 of the drawings, the port 59 is formed with a terminal 59', located in the plane of the radial ports 49, and located equidistantly between the openings of said radial ports; and a terminal 59" offset from the plane of said radial ports, but in lateral alinement with the opening of the next adjacent radial port, relative to the port 59', there being one port 59 between each of the openings of said radial ports.

In operation, it being assumed that the semaphore arm is in outswung position, and the ports are positioned as indicated in Figure 9, and it is desired to return the arm to normal position; the push rod is depressed to the extent of one tooth of the ratchet wheel, whereby the terminal 59' is brought into communication with the port 51, while the terminal 59" is brought into open communication with the port 60 in the wall of the bore. Obviously, the pressure in the cylinder will exhaust through the port 60, as indicated by the arrow of Figure 13, thus permitting the arm to be raised through the medium of the spring 23. A further actuation of the push rod to the extent of another tooth of the ratchet wheel, will again bring two of the radial ports 49 into communication respectively with the ports 50 and 51 to repeat a signal giving operation.

Thus, we provide a novel and effective means for controlling the distribution of air to the signal device, in combination with automatic regulating means for instantly securing a fairly uniform working pressure.

By constructing the casing in halves as described, assembling of the device is greatly facilitated, and a dust proof, compact casing is secured. To remove the cylinder 30 it is only necessary to partially withdraw the screw 30" to permit the cylinder head 30' to be lifted bodily edgewise out of the casing, the conduit 34 having been previously disconnected by unscrewing the gland 35 to permit the conduit to slip through the gap 33 in the undercut lug.

By this novel construction, manufacture of the parts is greatly cheapened. Further, by forking the semaphore arm as described, and mounting it on the shaft 18 so that the removal of the screws 20 will render the arm removable from the casing, convenient access to the wiring extending through the shank of the arm is had. Mounted preferably between the air controlling units 43, are the electric switch units 14. Each of these units are electrically connected by means of the spring contacts 61 and 62 with the rear signal element 13.

The rear signal element comprises preferably, a rectangular box divided into an upper and lower compartment by a central wall 63, diagrammatically indicated in Figure 21. The front wall of said box consists preferably, of a transparency extending over both upper and lower chambers to form a closure therefor, and which may be made of glass or other transparent material; said closure bearing legibly the words Stop and Back, one over each of said compartments. Within said compartments are the electric lamps 64 and 65, respectively; said lamps having electrical connection with the main conductor 66 leading from the battery 67. The circuit for the lamp 65 may be described as leading from the battery, to spring arm 61, through the unit 14, to spring arm 62, to conductor 68, to lamp.

The circuit for lamp 64 may be described as follows: from battery to spring contact 61', through unit 14, to spring arm 62', to conductor 69, to lamp, to battery.

Referring now to Figures 7 and 8 in the drawing, which represent respectively a side and top view of the electric switch unit 43, both of which are of substantially similar construction, 70 and 71 designate binding posts supported by means of the bolt 71' on the supporting frame 72. These binding posts are connected respectively with the spring contacts 61 and 62, the latter being separated by insulation block 73, and being insulated from the bolt by the insulation members 74 and 75. The frame 72 is mounted in the switch box in lateral alinement with the frame 44 of the air controlling unit, and rotatably carries a ratchet wheel 76, substantially similar to the ratchet wheel 46', hereinbefore described.

The frame is also provided with push rod mechanism substantially similar to the push rod mechanism shown and hereinbefore described for the air controlling unit, whereby the ratchet wheel may be actuated, the parts bearing the same reference numerals. The ratchet wheel is mounted on a shaft or bolt 77, which is preferably longitudinally in alinement with the valve plug 46 when mounted in the switch box. Rigidly mounted on said shaft is the commutator disk 78, preferably made of vulcanized fiber, or other insulating material, said disk carrying on its periphery and sides, three symmetrically positioned contact plates or members 79, each of said members extending across the periphery and slightly down opposite sides thereof.

The spring arm contacts 61 and 62 are so positioned on the frame, as to engage under stress opposite sides of said disk at a point in the path of said contact plates, so that when the disk is caused to be rotated, as by means of the push rod mechanism, the two contact arms will engage the plates progressively to close the circuit, as is best shown in Figures 7 and 11. The disk is so positioned on the shaft 77, relative to the ratchet wheel, as to close the circuit with each alternate push rod movement. The push rod button of each of the units carries an indicating letter such as S and B (Fig. 6), to indicate to the driver which of the lamps in the tail signal he is operating. As shown in Figure 21, the lamp 65 illuminates the transparency inscribed with the word "Stop," while the lamp 64 illuminates the transparency inscribed with the word "Back."

For the purpose of visibly indicating whether or not either of the lamps 64 and 65 at the rear of the car are energized, we provide, in connection with the electrical switch unit to be actuated thereby when the latter is actuated, auxiliary signaling means contained wholly in the switch box and visible from the driver's seat. This auxiliary means comprises, a stand 80, upon which is mounted the horizontally disposed pivot rod 81, extending at right angles to the shaft 77, upon which is pivotally supported a reciprocating member comprising a thin, flat signal arm 82, extending immediately adjacent to the inner side of the front wall of the switch box and adapted to cover the opening 83 in said wall when moved to a predetermined degree about its pivot.

Preferably integral with the arm is the upwardly extending finger 84, said finger being positioned in the path of the knees 85, secured to the outer side of the ratchet wheel 76. As shown in Figure 12, the knees, which constitute cams, are inclined in the direction of rotation of the ratchet wheel, while the finger 84 is accordingly bent to facilitate riding over said knees during actuation of the latter.

A spring 86, urges the signal arm constantly downward, so that when the ratchet wheel has assumed the position shown in Figure 12, the signal arm will be in unexposed raised position. When the ratchet wheel is caused to be moved to the extent of one tooth, the finger 84 will rest against the face of the ratchet wheel, as indicated by fine dotted lines in Figure 12, and the arm 82 will be exposed to view through the opening 83, at which time the circuit will also be closed as indicated in Figure 11. Thus, the face of the signal arm will be in register with the opening 83 and be exposed therethrough. The face of the arm is provided with a phosphorescent mixture to render it visible in the dark, so that the driver may know that the light in the rear signal element is on or off, as the case may be, there being an auxiliary signal device for each electric unit.

Referring to Figure 1, 87 and 88 designate binding posts adapted to receive electric conducting wires 87' and 88', respectively. Secured to the post 88 is the conductor wire 89 (Fig. 2), connected with a contact plate 90, located on the inside of the casing member 2' and insulated therefrom, and spaced slightly from the partition wall 28 therein. Secured to the wall 17 of the casing member is the segmental insulating plate 91, overlying which is the thin, metallic contact plate 92, said contact plate being formed with an integral spring arm contact 93, said arm extending at right angles to the piston rod 38 and beyond same to a point immediately adjacent to the contact plate 90 and adapted to rest, under stress, thereagainst.

Carried by the piston rod is the pin 94, adapted to engage with the spring arm 93 to normally hold the latter disengaged from said contact point, as indicated in Figure 2, when the piston 37 is in its normal inactive position. In operating, when the piston is actuated, the pin 94 will disengage the spring arm to permit the latter to contact with the plate 90 to close an electric circuit.

Mounted on the shaft 18 (Figs. 1 and 3), is the arm 95, made of insulating material, and carrying at its outer extremity the spring contact 96, said contact normally resting, under stress, upon the insulating plate 91, but being adapted, when said shaft is caused to be rotated, to engage, under stress during rotation, the contact plate 92 to close an electric circuit.

Referring to Figure 18, the shaft 18 is formed with a longitudinal groove 97, through which the electric conductor 98 (Fig. 3) is adapted to be strung, so that the wire may lead in the direction indicated by the arrows in said groove and upwardly in the groove 20 of the member 19' of the semaphore arm, and through the shank 19 thereof, to the electric lamp 98' in the head of the semaphore arm. The wire 98 extends through the insulating arm, as at 99, and has electric connection by means of the screw 99' with the spring contact 96, so that when the latter is engaged with the contact plate 92, current may flow through the conductor 98 to lamp 98', to conductor 98'' in the groove 21' of the fork member 19', to binding post 87, to conductor 87', to battery.

It will be noted, that when the piston is in its normal inactive position, the spring arm contact 93 is disengaged from the contact plate 90, so that when the semaphore arm is inadvertently pulled into signaling position, the semaphore light circuit remains open, whereby we are enabled to conserve the battery for the light circuit, as distinguished from semaphore signals wherein the light circuit remains unbroken during operation of the semaphore arm.

We have also taken advantage of the construction of the ordinary priming spark plug, the elbow 12', shown in Figure 15, being threaded into the usual threaded opening present in nearly all priming plugs.

We claim:

1. A device of the class described, embodying a casing, a semaphore arm, mechanism carried by said casing for actuating said arm, said mechanism including a rotatable shaft to which said arm is rigidly secured, and means, including a reciprocatory piston rod, responsive to the force of compressed air, for rotating said shaft to effect a signaling operation, conducting means connected with a source of compressed air for supplying the aforesaid means, manual valve mechanism in connection with said conducting means for controlling the air supply, and means for constantly urging said semaphore arm to non-signaling position, said first named means including a yielding connection between said shaft and piston rod, whereby said first named means is rendered operative solely to move said arm to signaling position.

2. In a device of the class described, embodying a casing, a movable part, mechanism in the casing operatively connected with said part to actuate it when said mechanism is actuated, said mechanism including a cylinder, a piston slidable therein, and a connection with a source of air pressure to actuate said piston, means for arbitrarily rendering the air pressure effective or ineffective, said means including a frame having ports, a rotary valve having ports, said valve being rotatable in said frame to bring its ports into communication with the ports thereof, responsive to an initial rotary movement of the valve to admit air to said cylinder, and other ports in said valve and frame adapted to communicate with said first named ports of the frame, and with the atmosphere by a subsequent rotary movement of said valve.

3. In an automobile signal device of the class described, in combination with a spark plug having a combustion chamber, of a casing, a part swingably mounted on said casing, mechanism within the casing operatively responsive to the force of compressed air for swinging said part to signaling position, said mechanism including a cylinder, a piston slidable therein, and an air conduit having an air control valve intermediate its terminals, one terminal thereof communicating with the interior of said cylinder and the other terminal thereof communicating with the combustion chamber of said spark plug for the purpose set forth.

4. In a direction signal for automobiles, the combination with a spark plug having a combustion chamber, and the motor, of signaling means, actuating means therefor adapted to be actuated by the pressure generated in the combustion chamber of said spark plug when the motor is active, said actuating means including a cylinder, a piston slidable therein, a conduit communicating with the combustion chamber of said spark plug and interior of said cylinder, and an air control valve between said spark plug and cylinder, said valve comprising a frame having spaced ports in open communication with said conduit, a rotary valve having ports adapted to communicate with the aforesaid ports to form a continuation of said conduit, when in one position, and other ports in said frame and valve adapted to communicate with the aforesaid ports responsive to a subsequent movement of said valve to another position, to break the continuity of said conduit and open the latter to the atmosphere.

5. In a direction signal device for automobiles, the combination with a spark plug having a combustion chamber communicating with the compression chamber of the motor, of pneumatically actuatable signaling means, and controlled manual compressed air distributing means operatively connected with said signaling means for arbitrarily supplying compressed air to the latter to actuate it, when the motor is active, said signaling means including a cylinder, a piston slidable in said cylinder, and a conduit in open communication with the interior of the cylinder and leading to said spark plug combustion chamber and being in open communication with the latter.

6. In a device of the class described in combination, of pneumatically actuated signaling means including a cylinder, an arm, a piston slidable in said cylinder having operative connection with said arm to actuate the latter when said piston is slid, manual controlled air pressure distributing means operatively connected to said signaling means for arbitrarily supplying air pressure to said cylinder to move said piston and having connection with a source of varying pressure, said connection including automatically actuated pressure regulating means.

7. In a device of the class described in combination, of signaling means adapted to be actuated by the pressure generated by the burning gases in the combustion chamber of an automobile motor cylinder, said means having operative connection with the combustion chamber of a motor cylinder to be actuated by the pressure generated therein by the burning gases during motor activity, valve mechanism for arbitrarily cutting off the pressure supply from said signaling means, a reserve pressure tank between said valve mechanism and the motor and check valve between the pressure tank and the motor for the purpose set forth.

8. In a device of the class described in combination, of pneumatic signaling means operatively connected by means of a conduit with the combustion chamber of the spark plug of an automobile motor to be actuated by the pressure created therein by the compression stroke of the motor, manual controlling means for cutting off said pressure to render the signaling means inoperative, said controlling means comprising in part, manual mechanism for effecting a step by step movement whereby said conduit may be opened to the atmosphere with each alternate movement of said step by step mechanism.

9. A direction signal for automobiles, comprising fluid-operated signal means, and means for controlling the supply of fluid pressure to said first means including a multi-ported valve, a reciprocatory actuator for the valve, and means operable by the actuator for bringing the ports of the valve successively into operative relation to the first means upon alternate reciprocations of said actuator and into inoperative relation upon other reciprocations of the actuator.

10. A direction indicator comprising a cylinder, a head therefor having a laterally disposed fluid pressure port and a lug overhanging the port and formed with a threaded opening, means for controlling the supply of fluid pressure to the cylinder, a conduit connecting the means to the cylinder port, and a clamp nut member engaged in the threaded opening of the lug to clamp the adjacent end of the conduit in the port of the cylinder head.

In testimony whereof we affix our signatures.

JOSEPH C. GELHAYE.
LEOPOLD A. SCHENZ.